United States Patent [19]

Mossman

[11] Patent Number: 4,636,173

[45] Date of Patent: Jan. 13, 1987

[54] METHOD FOR TEACHING READING

[76] Inventor: Robert Mossman, Cullen, Sloman, Cantor, Grauer, Scott & Rutherford, P.C., 3200 Penobscot Building, Detroit, Mich. 48226

[21] Appl. No.: 808,329

[22] Filed: Dec. 12, 1985

[51] Int. Cl.⁴ .............................................. G09B 17/00
[52] U.S. Cl. .................................................. 434/178
[58] Field of Search ....................... 434/178, 157, 156

[56] References Cited

U.S. PATENT DOCUMENTS 4,397,635 8/1983 Samuels ............................. 434/178

Primary Examiner—William H. Grieb
Attorney, Agent, or Firm—Cullen, Sloman, Cantor, Grauer, Scott & Rutherford

[57] ABSTRACT

A method of teaching reading involving a combined video and audible recording wherein the words which are displayed are pronounced by a recorded voice in synchronism with a temporary highlighting of the pronounced syllable or word, as by a change in brightness, size or color.

4 Claims, No Drawings

METHOD FOR TEACHING READING

BACKGROUND OF THE INVENTION

It is well known, in the teaching of reading, that the student should simultaneously see the word as he hears it pronounced. It has also been recognized, particularly with young students, that attention and interest can be enhanced by some form of animation or movement which directs the student's eye across the visual display in synchronism with the audible pronunciation of the displayed word, a technique which has been utilized in motion picture films or videotape. According to such technique, the student watches the film or tape, which is accompanied by an audible soundtrack. As the displayed words are pronounced by the recorded voice, a bouncing ball or similar figure is seen to move across the tops of the syllables or words in a bouncing fashion, with the position of the ball at any moment being synchronized with the pronunciation of the syllable or word directly beneath the ball. The movement of the ball assures that the visual focus of the student will be directed to the proper part of the displayed material and also aids in maintaining the interest and attention of the student.

Another advantage of the use of motion picture films or videotapes as a teaching medium, as contrasted with the traditional printed page of a book, is that young students are now oriented toward viewing television. A still further advantage is that, in the case of physically handicapped students, the student does not have to physically turn pages as he progresses through the material.

It is the principal object of the present invention to provide an improved method for teaching reading which takes advantage of modern media such as the currently popular magnetic videotape to provide a means to maintain the visual focus and attention of the student on the syllable or word being pronounced by the accompanying audible soundtrack.

According to the present invention, the syllable or word being pronounced by the soundtrack voice is temporarily highlighted either by a change in brightness, size or color relative to the remaining portion of the visual display. In this fashion, the eye of the student is directed and stimulated to follow the visual display in proper synchronism with the recorded audible pronunciation, thereby enhancing the quality of the learning experience.

DETAILED DESCRIPTION OF THE INVENTION

The present invention is described in the context of its use with the magnetic tape medium. However, it is to be understood that the invention may be employed with comparable effectiveness with other media capable of generating a continuously moving visible image and accompanying audible soundtrack.

Preferably, a visual display is generated on the viewing screen in a format similar to the printed page of a book. That is, the format preferably should have a conventional number of printed words per line and lines per page, giving due consideration to the age and attention span of the students. Particularly in the case of younger students, the interest and learning experience of the student may be enhanced by the use of interspersed pictures that are related to the subject of the printed text.

With a given page-like display visible on the screen, the teaching technique of the present invention involves the provision of an audible soundtrack which consists of a recorded voice pronouncing the displayed words, with the soundtrack being synchronized with a temporary visual highlighting of the particular syllables or words being pronounced.

The highlighting may consist of a temporary increase in brightness or size of the syllable or word being pronounced, or it may alternatively consist of a temporary change in the color of the syllable or word being pronounced. In this manner, the eye of the student is encouraged to progress across the printed message in precise synchronism with the audible pronunciation of the printed message. As the pronounced syllable or word is passed, the temporary highlighting disappears so that the intensity or boldness or color thereof returns to its normal state. In this manner, even after a momentary lapse of attention by the student, the student will instantly be redirected to the portion of the visual display which is being pronounced on the soundtrack.

The highlighting of the displayed words is accomplished by a conventional apparatus known as a video graphic controller or paint system. Specifically, and by way of example, Applicant has successfully employed an Aurora Model 125 system to temporarily highlight the pronounced word by means of a change in the color of the pronounced word.

This invention may be further developed within the scope of the claims. Accordingly, the foregoing specification is to be interpreted as illustrative of only a single operative embodiment of the present invention, rather than in a strictly limited sense.

I now claim:

1. In a method for teaching reading of the type characterized by a combined video and oral recording which comprises (1) a visual display of information in the form of alphabetic characters arranged either individually or in groups which are combined to represent words and (2) an audible soundtrack which records spoken pronunciation of such displayed information, the improvement which comprises the steps of:

synchronizing the recorded audible pronunciation of each syllable or word with a temporary recorded visible highlighting of such syllable or word as it is pronounced, the highlighting being in the form of a temporary change in the visual characteristics of the pronounced syllable or word, whereby the viewer can readily follow the reading of the visual display and correlate the sound of the displayed syllable or word with its written representation merely by following the visible highlighting as such highlighting progresses through the visual display.

2. The method of claim 1 wherein said highlighting step comprises changing the color of the pronounced syllable or word.

3. The method of claim 1 wherein said highlighting step comprises changing the intensity of the pronounced syllable or word.

4. The method of claim 1 wherein said highlighting step comprises changing the size of the pronounced syllable or word.